Feb. 4, 1930.  R. SIMPSON  1,745,722
ELECTRICAL MEASURING INSTRUMENT
Filed May 6, 1929   2 Sheets-Sheet 1

Inventor:
Ray Simpson
By Williams, Bradbury, McCaleb & Hinkle
Attys.

Feb. 4, 1930.   R. SIMPSON   1,745,722
ELECTRICAL MEASURING INSTRUMENT
Filed May 6, 1929   2 Sheets-Sheet 2
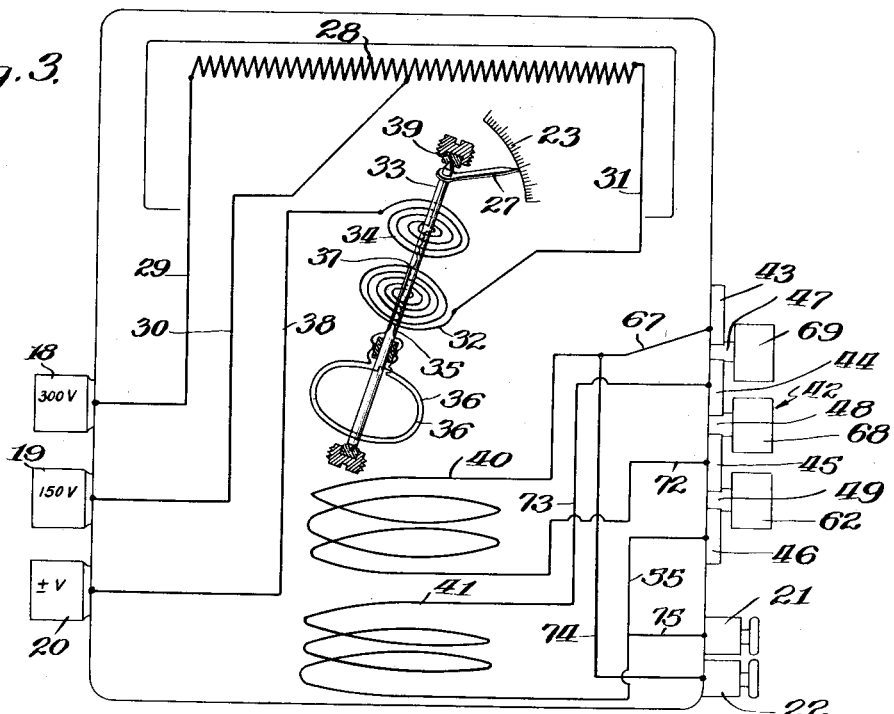
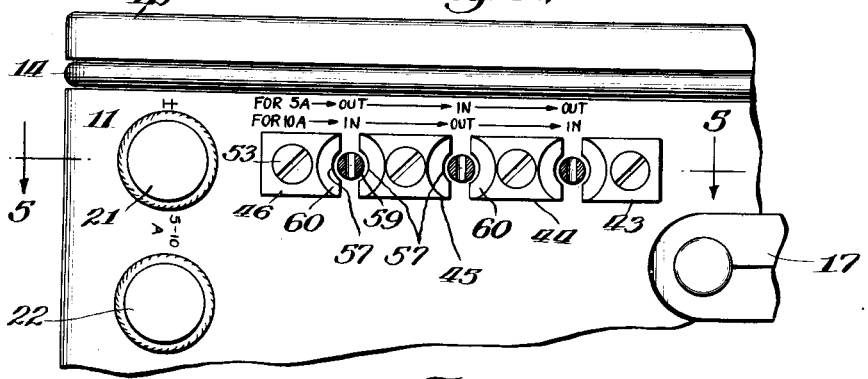
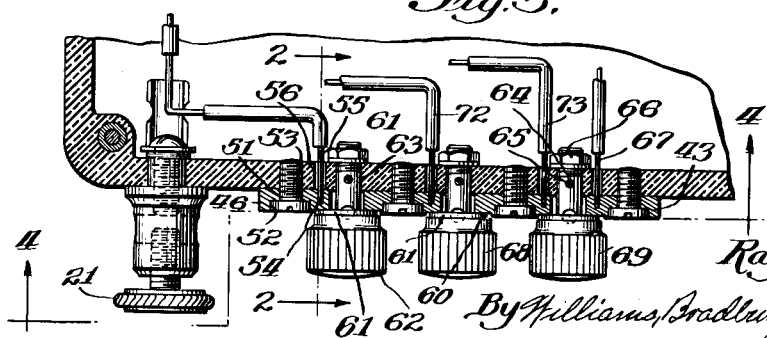
Inventor
Ray Simpson
By Williams, Bradbury, McCaleb & Hinkle
Attys.

Patented Feb. 4, 1930

1,745,722

UNITED STATES PATENT OFFICE

RAY SIMPSON, OF RIVER FOREST, ILLINOIS, ASSIGNOR TO JEWELL ELECTRICAL INSTRUMENT CO., OF CHICAGO, ILLINOIS, A CORPORATION OF ILLINOIS

ELECTRICAL MEASURING INSTRUMENT

Application filed May 6, 1929. Serial No. 360,892.

The present invention relates to electrical measuring instruments, and is particularly concerned with multi-range measuring instruments.

In the multi-range instruments of the prior art, ordinary rotating electrical switches have been used for changing connections of the instrument conductors, but such switches have the inherent disadvantage that the contact resistance varies greatly with the physical conditions present in the switch, such as corrosion, resilience of the contacts, exact position of the contacts at any given closed position, and the relative parallelism and area of the contact surfaces.

For instance, an ordinary resilient contact switch may have a different area of contact, depending upon the exact position to which it is turned and furthermore a slight twist of the resilient contact may change the parallelism of the contact surfaces so that the contact resistance is changed considerably. As a result of the foregoing, it is generally true that in the use of a measuring instrument having a low resistance circuit, such as an ammeter or a wattmeter, the introduction of an ordinary switch in the low resistance circuit will cause the resistance of the circuit to vary greatly and have a corresponding bad effect upon the accuracy of the instrument.

One of the objects of the present invention is the provision of a multi-range electrical instrument, having a plurality of coils which are capable of connection in different ways for the purpose of changing the range of the instrument by means of connectors carried by the instrument, as distinguished from the use of an ordinary switch.

Another object is the provision of a novel connector structure which is capable of connecting the low resistance circuits of a measuring instrument, with a minimum and unvarying contact resistance, whereby a multi-range instrument may be provided having a high degree of accuracy.

Another object is the provision of a connector for measuring instruments, which is quick in its connection, sturdy in its construction, substantially constant in contact resistance and economically manufactured and assembled.

Other objects and advantages of the invention will be apparent from the following description and from the accompanying drawings, in which similar characters of reference indicate similar parts throughout the several views.

Referring to the drawings, of which there are two sheets;

Fig. 3 is a diagrammatic view of the circuits and mechanism of the measuring instrument;

Fig. 4 is a side elevational view of the connecting mechanism in partial section, on the plane of the line 4—4 of Fig. 5;

Fig. 5 is a sectional view taken on the plane of the line 5—5 of Fig. 4.

Figure 1:
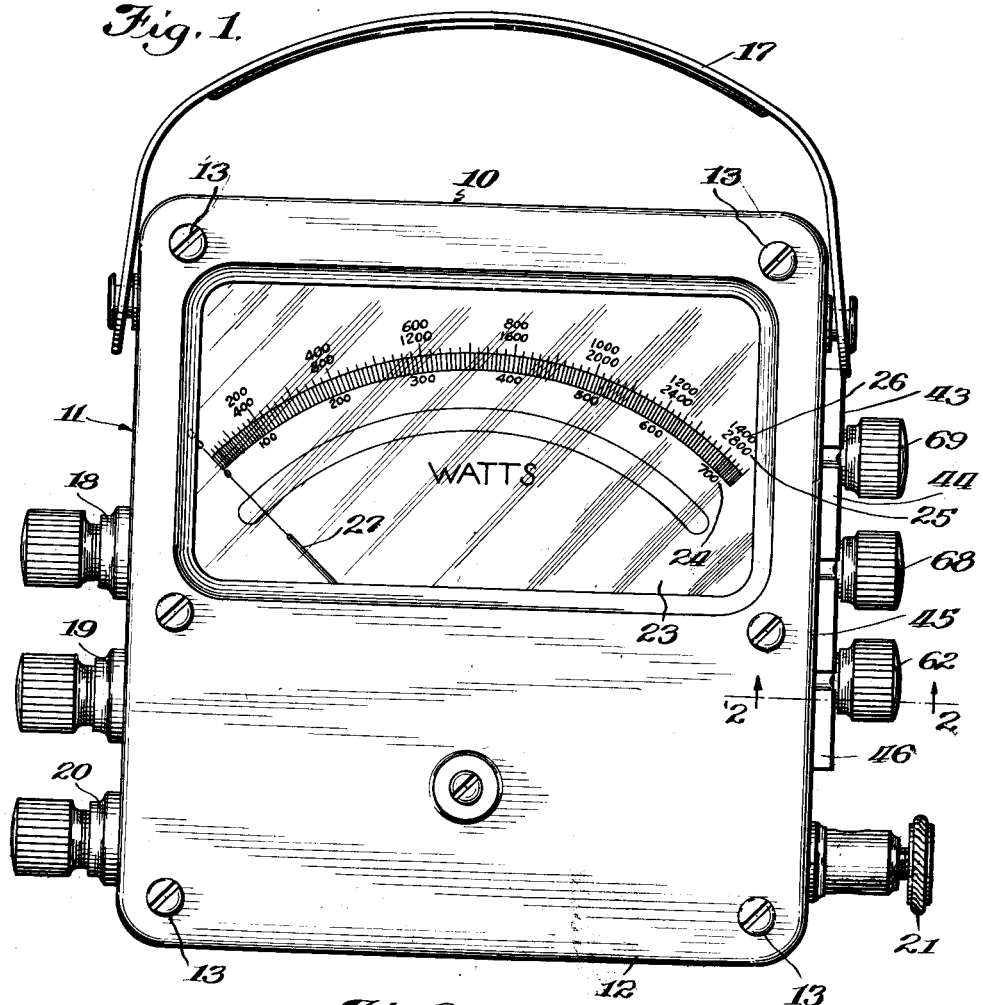
Fig. 1 is a top plan view of an electrical measuring instrument embodying the present invention.
Figure 2:
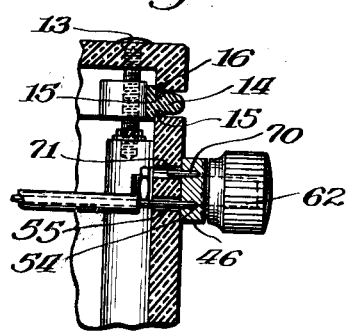
Fig. 2 is a sectional view taken on the plane 2—2 of Figs. 1 or 5.

Referring to Fig. 1, the electrical measuring instrument, indicated in its entirety at 10, may be enclosed in a casing 11 provided with a cover 12, secured to the casing 11 by a plurality of screw bolts 13. The casing 11 is preferably molded of insulating material such as a phenol condensation product, and in order to compensate for inaccuracies or warp between the cover 12 and casing 11, a skeleton frame 14 of the same material may be provided, having grooves 15 for receiving resilient rubber gaskets 16. The casing 11 is provided with a handle 17 and with a plurality of terminals or binding posts 18, 19, 20, 21 and 22 for connections to the circuits in which the measurements are to be made.

The present invention is applicable to various types of measuring instruments, such as ammeters, wattmeters and others, but the embodiment which has been chosen to illustrate the invention is a wattmeter of the moving coil type. The exact construction of the instrument itself may be varied considerably within the scope of the present invention, and consequently the mechanism of the wattmeter is merely illustrated diagrammatically in Figs. 1 and 3.

The instrument enclosed in the casing 11 preferably includes a dial 23, having a plurality of scales 24, 25, 26 adapted to cooperate with the moving pointer 27 in indicating the wattage when the instrument is used upon any particular range. The relation of the various scales to the connection of the circuits will be explained in detail hereinafter.

Referring to Fig. 3, the moving mechanism (with the exception of the damping fan), is here illustrated diagrammatically to show the various circuits in the instrument. The wattmeter preferably includes a resistance element which may be of a construction substantially similar to that illustrated in my prior application, Serial No. 187,278, filed April 28, 1927, Patent No. 1,720,381, issued July 9, 1929, and one end of the resistance element 28 may be connected by a conductor 29 to the connector 18. A central tap or conductor 30 may connect an intermediate part of the resistance 28 with the connector 19. The opposite end of the resistance 28 may be connected by a conductor 31 to a coil spring 32 which is supported upon a spindle 33 and insulated from a similar coil spring 34. The opposite end of the coil spring 32 may be connected by an insulated wire conductor 35 to one end of the dynamometer coils 36, the coils 36 being connected in series, and the opposite ends of the coils 36 being connected by a conductor 37 to one end of the other coil spring 34.

The other end of the coil spring 34 is connected by a conductor 38 to the terminal connector 20. The exact details of construction of the moving element and spindle 33 form no part of the present invention, and consequently this construction is not illustrated in detail.

The spindle 33 is of course provided with a pointer 27 shown diagrammatically in Fig. 3 adjacent dial 23, the spindle being rotatably supported in jewels 39. It will thus be observed that the circuit through the dynamometer coils 36 may be traced from the terminal connector 20 in two ways, as follows. First, through elements 20, 38, 34, 37, 36, 35, 32, 31, 28, 30 and 19; second, through the same circuit, but from the resistance 28 through conductor 29 to terminal connector 18.

The casing 11 preferably bears indicia adjacent terminal connectors 18, 19, 20, such as 300V, 150V, ± V, and it will be evident that the foregoing assembly of elements provides dynamometer coil circuits which are appropriate for use upon circuits having a voltage of either 150 volts or 300 volts. The exact capacity of the measuring instrument circuits depends, of course, upon the characteristics of the resistance and coils, and the foregoing is merely illustrative of one embodiment of the invention.

The wattmeter 10 is, of course, provided with an appropriate magnetic shield (not shown), and with fixed current coils 40 and 41 carried by an appropriate support about the dynamometer coils 36.

In order to provide an instrument capable of multi-range operation with a high degree of accuracy, the instrument is preferably provided with a plurality of connectors indicated in their entirety at 42, for the purpose of connecting the coils 40 and 41 in series, or in parallel, to change the range of the instrument. The connectors 42 may comprise a series of relatively flat metal members 43, 44, 45, 46 fixedly mounted upon the casing 11 in spaced relation to each other and to the threaded members or bolts 47, 48, 49.

Thus, the metal member 46 comprises a plate having an aperture 51 and a counterbore 52 for receiving the screw bolt 53 threaded into the side of casing 11 to secure the plate 46 upon the casing. The metal member 46 may be secured against rotation by providing a socket 54 for receiving the end of a conductor 55 which also passes through the registering aperture 56 in casing 11, the conductor 55 being soldered into socket 54.

In order to increase the contact area, the metal member 46 may be provided with a curved end 57 adjacent the bolt 59 and with a relatively flat surface 60 for engagement with the metal plate 61 of a binding post nut 62. The binding post nut comprises a molded insulating member constructed of a phenol condensation product molded about a threaded member 61 which is complementary to the threaded ends of the bolts 59. The connectors 42 are preferably of the type which are not removable from the bolts 59 so that the nuts 62, 68, 69 cannot be lost.

Each of the bolts 47, 48, 49 may be secured in apertures 63 in casing 11, in spaced relation to the adjacent metal portions of the connectors 42, by providing pins 64 which are driven downward from the upper edge of casing 11 through a bore in the casing registering with a corresponding bore 65 in each of the bolts. The pins 64 hold the bolts against rotation and enable the bolts to be secured in place by the use of nuts 66 inside of casing 11.

The metal member 43 is of substantially the same construction as metal member 46 with the exception that metal member 43 is permanently secured to a conductor 67. The intermediate metal members 44 and 45 differ from the metal members 43 and 46 in that they are provided with curved portions 57 adjacent each end and with relatively flat surfaces 60 adjacent each end for engagement with the adjacent nuts 62, 68 and 69.

The metal members 43 to 46, inclusive, may also be provided with pins 70 adapted to project into apertures 71 on the side of casing 11 for preventing rotation and enabling the securement of these metal members to the casing by a single screw bolt.

The casing 11 is also provided with the terminal connectors 21 and 22, one of which, namely, connector 21 is labeled ±, and the other, namely, connector 22, labeled 5-10A as shown in Fig. 4. These terminal connectors may be of any conventional type and they comprise the terminals for using the instrument either on the 5 or 10 ampere range.

Since the terminal blocks on contacts 43 to 46, inclusive, are supported upon the insulating casing immediately adjacent the bolts 47, but spaced therefrom, these terminal members may be connected together by merely threading the connector nuts 62, 68, 69 upon their corresponding bolts 47, 48, 49 until the metal portion 61 of the connector nuts comes into frictional engagement with the metal blocks. It should be observed that the surfaces of the metal members 43 to 46, respectively, may be accurately ground so that when the nuts 62, 68, 69 are threaded home on their bolts, a connection is provided which is firm and always of substantially the same minimum contact resistance, so that a high degree of accuracy may be attained in the instrument.

The fixed coils 40 and 41 of the wattmeter may be connected to the connectors 42 as follows. One end of the coil 40 may be connected by a conductor 67 to a metal member 43, the opposite end of coil 40 may be connected by a conductor 72 to metal member 45. The one end of coil 41 may be connected by a conductor 73 to metal member 44, and the opposite end of coil 41 may be connected by conductor 55 to metal member 46.

A conductor 74 leads from the conductor 67 or metal member 43 to the terminal 22, and a conductor 75 leads from conductor 55 or metal member 46 to terminal 21.

It will thus be observed that by threading the terminal nut 68 into contact with members 44 and 45, the fixed coils 40 and 41 are placed in series through the terminals 21, 22; the circuit being traced through the following elements, 21, 75, 41, 73, 44, 68, 45, 72, 40, 67, 74, 22.

When the terminal nut 68 is threaded out of contact with its adjacent connector plates, and the terminals 69 and 62 are threaded into engagement with their connector plates, the fixed coils 40 and 41 are placed in parallel circuit from the terminals 21, 22, since the connectors then connect the upper and lower ends of the coils as shown in Fig. 3, together, respectively. The parallel circuits may then be traced as follows, first (through coil 41), 21, 75, 41, 73, 44, 69, 43, 67, 74, 22; second (through coil 40), 21, 75, 55, 46, 62, 45, 72, 40, 74, 22.

The casing 11 is preferably provided with indicia as shown in Fig. 4, adjacent the connectors 42 for indicating which of the terminal nuts 69, 68, 62 should be screwed in to contact with the connector plates for each range of the instrument. In the present embodiment the indicia for five amperes range, indicates that nut 62 should be out, nut 68 in and nut 69 out; for ten amperes range nut 62 should be in, nut 68 out and nut 69 in.

It will be evident to those skilled in the art that since the number of turns in each of the coils 40 and 41 is constant, when the coils are used in series for the five ampere range, the resulting ampere turns will be $5n$ ampere turns, plus $5n$ ampere turns, or $10n$ ampere turns, and the resulting force actuating the pointer 27 at full voltage will be sufficient to move the pointer to the end of the scale 23. When the coils 40 and 41 are placed in parallel for the ten ampere range, the ten amperes will be divided among the two coils, giving the same number of ampere turns or $5n$ plus $5n$, equals $10n$ ampere turns, and a proportionate scale reading.

On the other hand, it will also be evident that the dynamometer coils 36 may be used for either the 150 volt range or 300 volt range by the use of an appropriate resistance 28 permanently connected in circuit with the corresponding terminals.

It is, of course, necessary in using the instrument, to use the scale numerals corresponding to the product of the indicia appearing upon the terminals used, such as 750 watt indicia for the 5-ampere 150 volt range; the 1500 watt indicia for the 10 ampere-150 volt range, and the 3000 watt indicia for the 10 ampere-300 volt range.

It will thus be observed that I have invented a novel multi-range measuring instrument which is provided with a plurality of connectors for connecting the coils of the instrument in different ways to change the range of the instrument, and the present connectors may be used with a high degree of accuracy because they are adapted to provide an unvarying and minimum contact resistance. The connector system is quick, reliable, sturdy and capable of being manufactured and assembled at a low cost, without detracting in any manner from the accuracy of the instrument, so that the value of the instrument is greatly enhanced thereby.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an electrical measuring instrument, the combination of an insulating support, with a pair of metal members secured to said support in spaced relation, a threaded member fixedly mounted upon said support adjacent said metal members, a complementary threaded member mounted on said first mentioned threaded member and adapted to be moved into frictional engagement with said metal members, a plurality of other similar metal members and threaded members, and measuring instruments coils connected to said metal members to be connected in series or parallel.

2. In an electrical measuring instrument, the combination of an insulating casing, with a pair of metal members secured to said casing in spaced relation, a threaded member fixedly mounted upon said casing adjacent said metal members, a complementary threaded member mounted on said first mentioned threaded member and adapted to be moved into frictional engagement with said metal members, a plurality of other similar metal members and threaded members, measuring instruments coils connected to said metal members to be connected in series or parallel, indicating means including a dial having a plurality of scales, and indicia carried by said casing adjacent said complementary threaded members to indicate which of said latter members should be connected for use with any scale.

3. A wattmeter, comprising a casing, a resistance unit, therein, a plurality of voltage terminals, taps from said resistance to said terminals, a moving coil indicating element, connecting means from one of said terminals through said moving coil to said resistance, a plurality of fixed coils and connectors for connecting said fixed coils in series or in parallel.

4. In an electrical measuring instrument, the combination of a moving dynamometer element with indicating means for said element, a pair of fixed coils, and electrical connectors carried by said instrument for connecting said fixed coils in series or parallel to change the range of said instrument, said connectors comprising fixed metal members carried by said instrument in spaced relation to each other and threaded metal members adapted to be moved into frictional engagement with said fixed metal members.

5. In an electrical measuring instrument, the combination of an insulating support with a plurality of connectors for changing the range of said instrument, said connectors comprising a series of plates of conducting material, said plates having arcuate surfaces on each side of threaded studs carried by said insulating support, and threaded members carried by said studs and having annular metal surfaces for frictionally engaging said arcuate surfaces and bridging adjacent plates.

6. In an electrical measuring instrument, the combination of an insulating support with a plurality of connectors for changing the range of said instrument, said connectors comprising a series of plates of conducting material, said plates having arcuate surfaces on each side of threaded studs carried by said insulating support, threaded members carried by said studs and having annular metal surfaces for frictionally engaging said arcuate surfaces and bridging adjacent plates, and a molded insulating covering enclosing said threaded members with the exception of said annular surfaces.

In witness whereof, I hereunto subscribe my name this 24th day of April, 1929.

RAY SIMPSON.